United States Patent
Budnick et al.

(10) Patent No.: US 8,974,558 B2
(45) Date of Patent: Mar. 10, 2015

(54) METHOD AND DEVICE FOR PRODUCING A FUEL CONTAINING CARBON

(75) Inventors: Andre Budnick, Michelsneukirchen (DE); Van Cung Tran, Sulzbach-Rosenberg (DE)

(73) Assignee: Krones AG (DE)

( * ) Notice: Subject to any disclaimer, the term of this patent is extended or adjusted under 35 U.S.C. 154(b) by 782 days.

(21) Appl. No.: 13/254,776

(22) PCT Filed: Mar. 3, 2010

(86) PCT No.: PCT/EP2010/052653
§ 371 (c)(1),
(2), (4) Date: Sep. 2, 2011

(87) PCT Pub. No.: WO2010/100173
PCT Pub. Date: Sep. 10, 2010

(65) Prior Publication Data
US 2011/0314735 A1 Dec. 29, 2011

(30) Foreign Application Priority Data
Mar. 5, 2009 (DE) .......................... 10 2009 011 356

(51) Int. Cl.
*C10L 5/02* (2006.01)
*C10L 5/06* (2006.01)
*C10L 5/32* (2006.01)
*C10L 5/36* (2006.01)
*C10L 5/44* (2006.01)

(52) U.S. Cl.
CPC ... *C10L 5/32* (2013.01); *C10L 5/02* (2013.01); *C10L 5/361* (2013.01); *C10L 5/363* (2013.01); *C10L 5/44* (2013.01); *Y02E 50/10* (2013.01); *Y02E 50/30* (2013.01)

USPC .............................. 48/197 R; 44/592; 44/596

(58) Field of Classification Search
CPC .......................................................... C10L 5/32
USPC .................................................... 44/592–598
See application file for complete search history.

(56) References Cited

U.S. PATENT DOCUMENTS

| | | | |
|---|---|---|---|
| 4,274,836 A | 6/1981 | Ban et al. | 44/6 |
| 5,972,058 A * | 10/1999 | Torkkeli | 44/552 |
| 6,401,634 B1 * | 6/2002 | Anderson | 110/342 |

FOREIGN PATENT DOCUMENTS

| | | | |
|---|---|---|---|
| DE | 10227074 | 1/2004 | C10J 3/54 |
| DE | 202006011668 | 11/2006 | C10L 5/44 |
| DE | 202006008516 | 11/2007 | C10L 5/44 |
| EP | 1837390 | 3/2007 | C10L 5/44 |
| EP | 1978076 | 2/2008 | C10L 5/04 |

OTHER PUBLICATIONS

Ukrainian Official Action issued in corresponding Ukrainian Patent Appln. No. a 2011 11659 dated Jun. 6, 2014 (3 pgs).

* cited by examiner

*Primary Examiner* — Matthew Merkling
(74) *Attorney, Agent, or Firm* — Hayes Soloway P.C.

(57) ABSTRACT

Described is a method for producing a fuel containing carbon, wherein the fuel is formed by compressing raw material containing a carbon and adding an additive that promotes thermal utilization of the fuel at a specified amount. The additive contains a chemical compound made of the elements calcium and/or magnesium and having or not having carbon. In a first method step, the raw material containing carbon is pressed and in this way a pressed article is produced. Then the additive is fed to at least one area of said pressed fuel article.

9 Claims, 1 Drawing Sheet

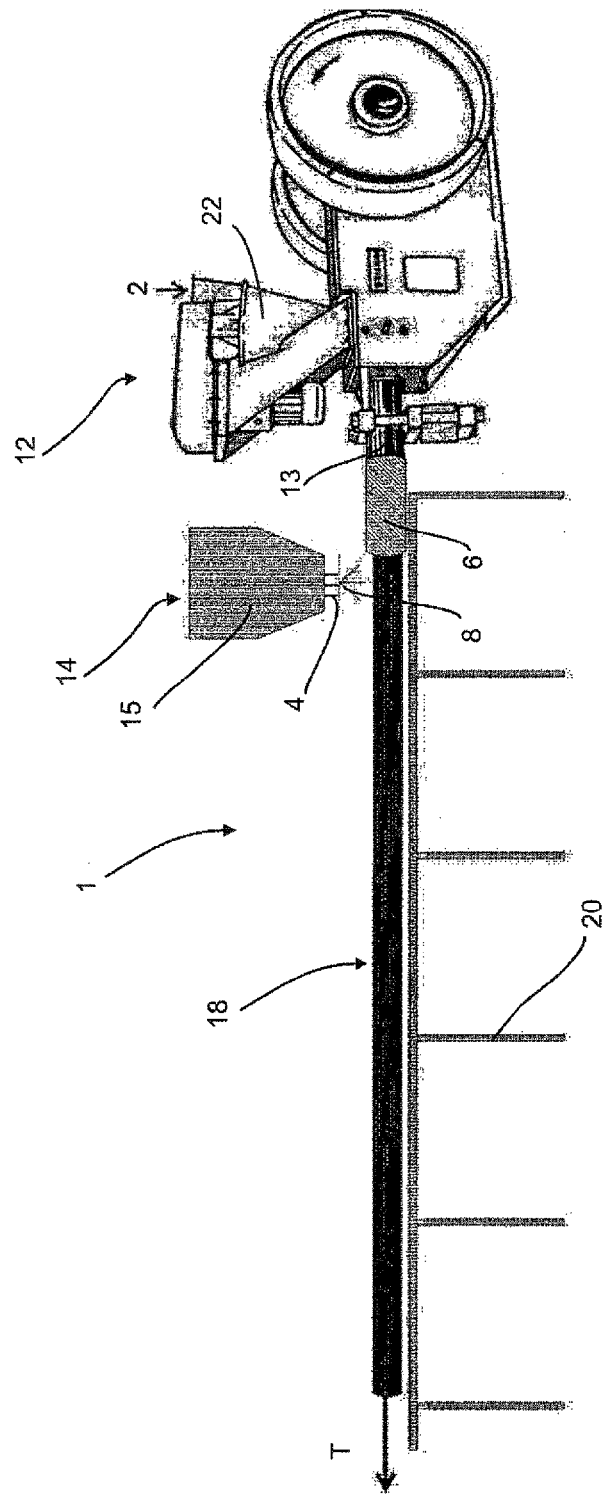

METHOD AND DEVICE FOR PRODUCING A FUEL CONTAINING CARBON

BACKGROUND OF THE INVENTION

The present invention relates to a method and device for producing a fuel containing carbon. Such fuels can be used, for example, for converting raw materials containing carbon into preferably liquid fuels. In this context, it has been known for a long time from the prior art to gasify biomass in order to obtain fuels in this manner. Thus, for example, a method for gasifying biomass and a plant for this are known from DE 102 27 074 A1. In this, the substances are burned in a combustion chamber separated in a gas-tight manner from a gasification reactor, and the thermal energy from the combustion chamber is introduced into the gasification reactor.

It is known in the prior art that renewable raw materials, such as wood, straw, hay and oil-containing plants, can be used as a substitute for fossil energy carriers, such as fuel oil and natural gas. In addition, refuse and waste also generally are increasingly being discovered as secondary raw materials and are being put to thermal utilization.

EP 1837390 A1 discloses a method and a device for processing untreated wood and similar fuel. In this method, this fuel passes through a drying phase and can then be provided for production of heat. In this context, the purely biological fuel is processed with the addition of quicklime and this mixture is used for production of heat directly or after a compaction which follows the mixing. A reduction in the water content in the fuel is said to be achieved by the addition of quicklime.

This is known, for example, for sewage sludges, which because of worldwide restrictive directives are being used increasingly as a raw material for thermal gasification. However, conventional primary raw material carriers, such as coal, are also acquiring an importance as energy carriers which will increase in the future. The conversion of fuels containing carbon into thermal energy can take place directly or can also be used for production of higher performance fuels or also gas or bio fuels.

Processes known in this respect are fermentation, combustion, oil conversion and gasification of such fuels. In this context it is likewise known to carry out thermal conversions of such fuels in a high temperature range from approx. 800° C. In order to carry out this conversion, the raw materials should have a low moisture content. It is known in this context to comminute, such as, for example, to chop, shred, mince, the raw materials before use and then to dry and to press them and to feed them to the conversion process in compressed form. In this context, in the prior art pressing of the raw material is carried out, for example, with hydraulic or mechanical presses, which leads to an easier handling for the subsequent processing process.

In the actual thermal conversion processes, such as, for example, a combustion or gasification, however, in the prior art a formation of lumps, reduction to slag or vitrification of the ash may occur, which in turn causes increased difficulties in the cleaning of corresponding plants. It is therefore known from the prior art that lime or dolomite is added to the fuel in order to achieve an increase in the ash melting point or ash softening point in this manner.

Some biomasses, such as, for example, straw, thus have a high chloride or potassium content, their ash softening point of about 800° C. being significantly below that of, for example, wood of 1,200° C. In the case of pressed articles of forest wood and residual wood also, an addition of lime increases the ash melting point or the ash softening point and in this manner allows a use of the pressed fuel articles at temperatures in the thermal conversion process of more than 1,200° C. This also applies correspondingly to pressed articles produced from waste and sewage sludges with a high mineral content.

It is furthermore known from the prior art to mix the raw material with the additive, for example pulverulent lime, beforehand and then to compress the mixture. However, this results in disadvantages during the compressing operation, that is to say the strength of the pressed articles is impaired by this operation.

SUMMARY OF THE INVENTION

The present invention is therefore based on the object of improving a fuel for gasification plants. In particular, the invention is based on the object of providing a device and a method by means of which an additive which improves the possibility of gasification of the fuel can be added to the fuel. In addition, a possibility for being able to meter such additives or to add them in variable amounts is to be provided. A low-dust method for supplying the raw material, for example, with lime is furthermore to be provided.

In a method according to the invention for producing a fuel containing carbon, in particular as a raw material for thermal utilization, the fuel is formed by compressing raw material containing carbon and adding a predetermined amount of an additive which promotes a thermal utilization of the fuel, the additive containing a chemical compound of the elements calcium and/or magnesium with or without carbon. Generally, alkaline earth metal salts could be used.

According to the invention, in a first step the raw material containing carbon is compressed and a pressed fuel article is produced in this manner, and the additive is then fed to at least one area, and preferably at least one surface, of this pressed fuel article. However, this feeding of the additive is preferably carried out indeed before the thermal utilization, that is to say, in particular, indeed before the introduction of the fuel into a gasifier.

By the feeding according to the invention of the additive after the compression of the raw material, the amount of additive fed to the pressed fuel article can be metered more accurately. It is thus envisaged that the fuel, for example from primary raw materials, such as rapidly renewable energy woods, residual and waste wood, forest wood, wood chips, straw, hay, but also raw materials of fossil origin, such as coal, and secondary raw materials, such as waste and refuse, in compressed form as a pressed article, is processed by the subsequent addition of the additive, for example lime, and an increase in the ash melting point or ash softening point in a thermal utilization process is thereby achieved.

Since, as mentioned, a thermal utilization process preferably follows, it is possible to feed the additive via one surface of the pressed fuel article. However, it would also be possible not to feed the additive to the pressed fuel article via one surface, but to introduce it into the inside of the pressed fuel article, for example, via a cannula or something like that. By the procedure according to the invention, the ratio of the amounts of the additive to the fuel can also be varied in a flexible manner, and furthermore—as mentioned above—the stability of the pressed fuel article is not adversely changed by the addition of the additive.

Depending on the mineral composition of the fuel, the additive can be applied to the pressed fuel article in the desired amount after the actual production process, that is to say the pressing of the fuel, so that the ash melting point or ash softening point of the pressed fuel article in the thermal utilization process can be adjusted to an optimum level for the process individually for the fuel, this level preventing a formation of lumps, a reduction to slag or vitrification of the ash.

Preferably, the additive is lime or a lime-containing substance. However, other compounds containing calcium and/or magnesium with or without carbon, and in particular calcium carbonate rocks, such as, for example, chalk or dolomite, but also magnesium oxide and/or calcium oxide, could also be used.

Preferably, a liquid substance is applied to the pressed fuel article, this liquid substance containing the additive or being the additive. The pressed fuel articles are thus treated and produced by applying the additive, in particular in a liquid consistency and/or of varying thickness, to the compressed articles, which can also be, for example, in the form of briquettes or pellets, preferably to the surface thereof.

Application of the additive in liquid form can prevent this from being blown off or worn away during further transportation of the pressed fuel article with the additive.

Preferably, the additive is fed to several surfaces or surface segments of the pressed fuel article. This means that the additive can be applied to the surface completely or partly, on one side or on several sides or also on the inside or outside.

In a further preferred method, the additive is fed to the surface by brushing on the additive, spraying on the additive, pressing on the additive, dipping the pressed fuel article into the additive, combinations thereof or the like. In this context it is possible, for example, to carry out the application of the additive, for example lime, via a printing, brushing, dipping or spraying device, for example a roller, a brush, by means of a dipping bath or by means of a nozzle.

As mentioned above, the additive is present in a liquid consistency during the application, and this can be either a viscous or a thinly liquid consistency. This also depends on the ratio of the amounts of additive to fuel which is optimum for the method.

Preferably, in addition to the actual substance which promotes the thermal utilization, such as, for example, lime, a further substance, such as, for example, water and/or a binder, is therefore added. In this case the additive is composed of lime and water.

Preferably, the content of lime in the additive can be varied, as a result of which it is possible to react to different framework conditions of the method.

In a further preferred method, the additive contains water or binder. It would also be possible, for example, for lime to be present in liquid form and also to contain, in addition to water, binders which render possible a change in the consistency of the liquid state. In this context it would also be possible for an adhesive layer first to be applied to the pressed fuel article, and on to this in turn the additive.

Furthermore, the one rough surface of the pressed fuel article is utilized during application of the additive. In this context it is also possible that a correspondingly thinly liquid additive enters into the inside of the pressed fuel article, or intersperses this. Preferably, the additive is fed to the pressed fuel article in an amount such that the weight content of the substance which promotes the thermal utilization is between 0.5% and 10%, preferably between 1% and 3% (based on the total weight of the pressed fuel article).

In a further preferred method, the pressed fuel article is transported along a predetel transportation zone. In this context it is possible for the pressed fuel article first to he produced by pressing and then to be conveyed. As mentioned, by the addition of the additive, and in particular of lime, to the surface of the pressed fuel article, an adjustment or increase in the ash melting point or ash softening point in a subsequent thermal utilization process can be made individually for the fuel.

By addition of a variable amount of lime to the surface of the pressed fuel article, an adjustment of the ash melting point or ash softening point can be rendered possible individually for the fuel to maintain a reactor temperature in the thermal utilization process which is optimum for the method. It is also to be noted here that the pressed fuel article mentioned can have different ash melting points or ash softening points, depending on its composition.

The shape of the pressed article can also differ, for example round, oval or angular, including in different thicknesses and lengths. The pressed fuel articles formed, produced by a high degree of compaction, remain dimensionally stable during storage for several months, and also no formation of lumps, caking or merging together of the pressed articles takes place. Favourable pouring and triclding properties and ease of metering of the pressed articles according to the invention therefore exists even after relatively long storage times. Because of the relatively long storage times, the addition of lime to the pressed fuel articles by a method free from lime dust is also advisable.

Binding of the additive or lime to the surface of the pressed fuel article is improved if the pressed articles have a high temperature after the pressing operations and the additive therefore dries comparatively rapidly. The lime-containing pressed fuel articles treated in this way show no disadvantages with respect to the strength and stability with respect to pressed articles without an additive, since—as mentioned—the additive is preferably applied to the surface thereof.

It is furthermore also possible to achieve a change in the ratio of the amounts of additive to fuel by an application area of different size, it being possible for the lime also to be applied to several sides of the pressed article and an addition in liquid form, that is to say thinly liquid to viscous, preventing dust formation. The method according to the invention furthermore allows the amount of lime to be applied to be adjusted in the manner described above with a short reaction time, so that the ash melting point or the ash softening point can be influenced rapidly according to the mineral composition of the fuel.

The present invention furthermore relates to a method for converting products containing carbon into preferably liquid fuels, wherein in a first method step a fuel containing carbon is produced by a method of the type described above and the fuel is then gasified in a gasifier, and preferably a fixed bed gasifier.

However, another thermal treatment of the fuel produced in this manner would also be possible here.

The present invention furthermore relates to a device for producing a carbon-containing fuel, which comprises a pressing device which presses a raw material containing carbon to give pressed fuel articles and an adding device which feeds to the raw material an additive which promotes a thermal utilization of the fuel. According to the invention, the adding device is arranged downstream with respect to the pressing device in a conveying direction of the fuel and is configured such that it feeds the additive to at least one surface or one area of the pressed fuel article.

The device according to the invention is therefore also configured such that the pressed fuel article is first produced, and the additive is then fed to this, preferably via its surfaces.

In an advantageous embodiment, a predetermined transportation zone is arranged between the pressing device and the adding device, along which the pressed fuel article can be transported. In this context, the pressed fuel article can also be cooled along the transportation zone.

In a further advantageous embodiment, the adding device comprises a metering device in order to meter the amount of the additive. In this context the metering device can be configured such that, for example, it varies the lime content within the additive, but it would also be possible for the metering device to be configured such that the amount of additive in its entirety which arrives on the pressed fuel article can be varied. Preferably, the adding device comprises a spraying device or a brushing device which applies the additive to the pressed fuel article.

In a further advantageous embodiment, the adding device is arranged above a transportation pathway of the pressed fuel article. In this context this adding device can be configured such that it charges a continuous strand of the pressed article.

BRIEF DESCRIPTION OF THE DRAWINGS

Further advantageous embodiments can be seen from the attached figure. This shows:

FIG. 1 a diagram of a device according to the invention.

DETAILED DESCRIPTION OF THE INVENTION

FIG. 1 shows a device 1 according to the invention. This device 1 comprises a pressing device 12, to which a raw material 2 can be fed via a feeding device 22. The pressing device 12 produces from this raw material a pressed fuel article 6, which can be pushed through a tube 13 of the pressing device 12 out of this device.

The reference symbol 14 identifies an adding device which feeds additive 4 to the pressed fuel articles which have already been pressed. In this context, this adding device can have a reservoir 15 for storing the additive. It is furthermore possible for the adding device 14 to comprise one or a plurality of spray heads or nozzles 8 in order to apply the additive to the pressed fuel articles 6.

In addition, a mixing device (not shown) which mixes the additive, for example the substance which promotes the thermal utilization, with a further substance, such as, for example, water, can be provided. In this context a predetermined content of the substance which promotes the thermal utilization can also be adjusted with this mixing device.

In the transportation direction T, the adding device is followed by a cooling and transportation zone 18, along which cooling of the pressed fuel articles 6 takes place. An application device which is arranged between the pressing device 12 and the adding device 14 and which feeds a further additive, such as, for example, an adhesive, to the pressed fuel article could furthermore be provided. The pressed fuel article 6, which is already charged with the additive along its transportation pathway downstream of the adding device, is—as shown in FIG. 1—fed on a stand 20.

The pressed fuel article produced in this way and charged with additive could be stored or also fed directly to a gasifier (not shown).

Due to the high temperatures of the pressed fuel article, the additive dries rapidly. On the other hand, no additive is introduced into the pressing device 12, so that abrasion can be prevented in this manner.

All the features disclosed in the application are claimed as essential to the invention where individually or in combination, they are novel with respect to the prior art.

List of Reference Symbols

1 Device
2 Raw material
4 Additive
6 Pressed fuel article
8 Spray head
12 Pressing device
13 Tube
14 Adding device
15 Reservoir
18 Transportation zone
20 Stand
22 Feeding device
T Transportation direction

The invention claimed is:

1. A method for producing a fuel containing carbon, wherein the fuel is formed by compressing raw material containing carbon and adding a predetermined amount of an additive which promotes a thermal utilization of the fuel, and the additive contains an alkaline earth metal salt,
wherein
in a first method step the raw material containing carbon is compressed and a pressed fuel article is produced in this manner, and the additive is then added to at least one area of this pressed fuel article, wherein the additive is fed to several surfaces or surface segments of the pressed fuel article by a adding device, which is arranged above a transportation pathway of the pressed fuel article, and the composition of the additive is varied by a metering device of the adding device to react to different conditions.

2. The method according to claim 1,
wherein
the additive is applied to the pressed fuel article in a liquid substance.

3. The method according to claim 1,
wherein
the additive contains lime.

4. The method according to claim 1,
wherein
the additive is fed to the surface by brushing on the additive, spraying on the additive, pressing on the additive, dipping the pressed fuel article into the additive, or a combination thereof.

5. The method according to claim 1,
wherein
the additive contains water or binder.

6. The method according to claim 1,
wherein
the pressed fuel article is transported along a predetermined transportation zone.

7. The method for converting raw materials containing carbon into gaseous and/or liquid fuels, wherein in a first method step a fuel containing carbon is produced by a method according to claim 1 and this fuel is then gasified in a gasifier.

8. The method according to claim 1,
wherein
the additive contains at least one of the elements calcium and magnesium.

9. The method according to claim 1,
wherein
the additive contains carbon.

* * * * *